United States Patent [19]

Strong

[11] 3,764,578

[45] Oct. 9, 1973

[54] STABILIZATION OF POLYMERCAPTANS

[75] Inventor: Douglas H. Strong, Mentor, Ohio

[73] Assignee: Diamond Shamrock Corporation, Cleveland, Ohio

[22] Filed: Oct. 26, 1971

[21] Appl. No.: 192,578

Related U.S. Application Data

[63] Continuation-in-part of Ser. No. 880,415, Nov. 26, 1969, abandoned.

[52] U.S. Cl............ 260/45.7, 260/45.85, 260/830
[51] Int. Cl....................... C08d 7/10, C08d 11/04
[58] Field of Search ................... 260/45.7, 45.7 P, 260/830 S, 45.85

[56] References Cited
UNITED STATES PATENTS

| 3,457,219 | 7/1969 | Goble | 260/45.8 |
| 3,413,261 | 11/1968 | Schalin | 260/45.9 |
| 2,962,476 | 11/1960 | Verburg | 260/45.85 |
| 3,459,703 | 8/1969 | Briggs | 260/45.75 |

*Primary Examiner*—Donald E. Czaja
*Assistant Examiner*—William Parker
*Attorney*—Roy Davis et al.

[57] ABSTRACT

Liquid polymercaptan resins employed typically in sealants and adhesives, and typically having oxyalkylene linkages forming a portion of the polymer backbone, can show excellent color stability as well as suppressed skin formation, for filled and unfilled systems, during storage when such liquid resins are contacted with a chelating agent. For example, the agent can be blended directly with the resin or the resin can be washed with a dispersion or chelating agent in liquid medium prior to storage. Such agents do not deleteriously affect the desirable characteristics of the resin in use or storage.

3 Claims, No Drawings

STABILIZATION OF POLYMERCAPTANS

CROSS REFERENCE TO RELATED APPLICATION

This application is a continuation in part of U. S. application Ser. No. 880,415, filed Nov. 26, 1969 and now abandoned.

BACKGROUND OF THE INVENTION

Polymercaptan liquid resins which are often typically employed in sealing and caulking materials and in adhesive compositions include such resins as are virtually to completely free from disulfide linkages, contain mercaptan terminated groups in the polymer, as well as having an oxyalkylene component in the polymer. Such resins have been disclosed for example in U.S. Pat. Nos. 3,258,495, 3,278,496, and 3,361,723.

The storage of such resins before use may result in certain problems. For example, such polymers are known to be subject to a deleterious viscosity increase in a short storage time and can thereafter exhibit poor cure hardness during use. However, these problems can be overcome by blending the resin before storage with an aromatic antioxidant such as a p-benzoquinone, or a ring substituting phenol, or a ring substituted cresol as has been shown in U.S. Pat. No. 3,413,261.

Such liquid polymercaptan resins upon storage can also exhibit an undesirable viscosity decrease during even short storage periods and as a result may be difficult to cure or only partially cure to a viscous liquid. However, this storage problem can be overcome by blending the liquid resin before storage with a nitrogenous base having a $pK_a$ in aqueous solution at 25°C. above about 2, such as an amine, amide, urea, or an oxime and suitable such bases include triethanolamine, tris(dimethylaminomethyl) phenol, and ethanolurea, which have been shown in U.S. Pat. No. 3,457,219.

Another problem which may be found with polymercaptan liquid resins after storage, or in preparation for storage, is an undesirable change of color. For example, when a caulking or sealing use requires a creamy or off-white appearing sealant or caulking composition, a liquid polymercaptan resin which has been on the shelf for a few months may exhibit amber coloration, thus making it unsuitable for such application. Additionally, resins may be subjected during storage to a deleterious skin formation which must be removed and disposed of before such resin can be used. It is therefore an object of the present invention to suppress color change of freshly prepared resins, e.g., as may occur during mixing with stabilizers or the like in preparation for storage, and also to retain desirable color during storage, while maintaining the viscosity of such resins during storage. It is a further object of the present invention to suppress skin formation for stored resins, including filled systems.

SUMMARY OF THE INVENTION

Combining a liquid polymercaptan resin with one or more chelating agents has been found to provide excellent, enhanced color stability for the resin in storage and during preparation therefor, e.g., for such resins which are also blended with the viscosity stabilizing substances such as discussed hereinabove. Moreover, the blending of the resin with chelating agent can be employed to improve the color of the polymercaptan resin to more closely approach the coloration of freshly prepared resin, even when such resin has already been stored. Further, the chelating agent can be employed with polymercaptan resins to produce systems which on storage will display desirable suppression of skin formation.

Broadly, the present invention is directed to a resinous composition of enhanced color stability and retarded skin formation, comprising a liquid polymercaptan resin having an average molecular weight between about 300–25,000 and an SH equivalency of between about 0.05–6 milliequivalents per gram of resin, combined with a stabilizing amount of chelating substance. The chelating agents are selected from the group consisting of amino carboxylic acids, hydroxy carboxylic acids, inorganic condensed polyphosphates, 1, 3-diketones, and mixtures thereof, as well as salts and esters of such acids where they exist.

In one aspect, the invention is directed to such liquid resins containing oxyalkylene substituents and combined with between about 0.001–5.0 weight percent, based on the weight of the resin, of chelating agent.

DESCRIPTION OF THE PREFERRED EMBODIMENTS

The polymercaptan resin component is supplied by liquid polymeric materials such as have been exemplified in U.S. Pat. Nos. 3,258,495, 3,278,496, 3,355,512, 3,361,723, and 3,472,913. These polymercaptan resins are virtually, to completely, free from disulfide linkages, have thiol terminated groups, e.g., thiol terminated side chains. Representative resins such as are discussed more particularly hereinbelow, have polymer chains containing an oxyalkylene substituent. The polymercaptan resins consist essentially, to entirely, of carbon, hydrogen, and oxygen atoms with any additional atoms being typically only sulfur and halogen. Further, these polymercaptan resins have number average molecular weight between about 300–25,000 and an SH equivalency of between about 0.05–6.0 milliequivalents of mercaptan per gram of polymer. Resins having an SH equivalency below about 0.05 can be highly viscous and difficult to formulate with fillers, pigments, and the like as are polymercaptan resins which have a molecular weight above about 25,000. Resins having an SH equivalency greater than about 6.0 may require especial techniques to achieve desirable characteristics in the cured product. Such resins as have an average molecular weight below about 300 form products of retarded elasticity. Preferably, the polymercaptan resins have a number average molecular weight of between about 600–15,000 and an SH equivalency between about 0.2–4.5.

The polymercaptan resins in addition to being virtually, to completely, free from polysulfide linkages are liquid materials prior to cure. Exemplary resins can be prepared from polyepoxides such as polyepoxy-containing polymeric reaction products prepared from a halogen-containing epoxide reacted with an aliphatic polyhydric alcohol. Or an oxirane or epoxy material containing functional groups such as chlorine, can be polymerized in the presence of, for example, hydroxyl-terminated polyethers or polyesters, or polyhydric phenols including polynuclear phenols, and polycarboxylic acids. The functional groups such as chlorine should remain unreactive until subsequent conversion of the polymer to a polythiol, as with an alkali metal sulfhydrate.

Other suitable polymercaptan resins include thiol-containing polyether polymers formed, for example, from dihydric alcohols reacted with alkylene oxides to prepare intermediate products further reacted with halogen-containing epoxides. Or such resins can be prepared as adducts with, for example, hydrogen sulfide reacted with a polyepoxide having at least three vic-epoxy groups. Exemplary polyepoxides include glycidyl ethers of polyhydric alcohols or polyhydric phenols as well as esters of epoxy alchohols and polycarboxylic acids. Also, exemplary resins may be prepared from polymerized fatty acids by reaction with an epihalohydrin to prepare a halohydrin intermediate that is then converted most typically by reaction with an alkali metal sulfhydrate. A portion of these polymercaptan liquid polymers has been described in *Sealants*, by Adolfas Damusis on pages 197–204.

The chelating agents most typically employed are the amino carboxylic acids. This group of chelating agents is an extremely broad group of agents and such term "amino carboxylic acids" is meant to include not only such chelating agents as have carboxyl groups or salts of such groups but also such chelating agent compounds as have in addition to, or in place of, carboxyl groups or their salts groups wwhich include $-PO(OH)_2$ and $-SO_3H$, as well as salts of these groups typically alkali metal salts. The breadth of this important group of chelating agents can be demonstrated for example by a review of the more than 75 such agents which has been presented in *The Sequestration of Metals* by R. L. Smith, 1959, at pp. 88–98.

The most common commercially available amino carboxylic acid chelating agents, which for economy and efficiency are the preferred agents in the practice of this invention, together with their typical abbreviated designations employed herein for convenience are ethylenediamine-tetraacetic acid (EDTA), which may be available as a di-to tetra-alkali metal salt which may further be a monohydrate or dihydrate, N-hydroxyethylethylene-diaminetriacetic acid (HEDTA) generally available as a trialkali metal salt or as the dihydrate of same, diethylenetriamine-pentaacetic acid (DETPA) most typically available as the pentasodium salt, nitrilotriacetic acid (NTA) typically in commerce as a di- or trialkali metal salt which also may be anhydrous or in monohydrate form, diethanolglycine (DEG) available as an alkali metal salt most typically the sodium salt, and ethanoldiglycine (EDG) commercially offered as the disodium salt.

Further useful chelating agents include the hydroxy carboxylic acids most notably citric acid which may be used as an alkali metal salt or the like for example, trisodium salt or dibasic ammonium citrate. Such group of chelating agents also includes gluconic acid, oxalic acid, tartaric acid, itaconic acid, and kojic acid as well as derivatives of these, with oxalic acid being included herein for purposes of convenience as being a useful agent although not a hydroxy carboxylic acid. Exemplary derivatives of such acids include alkali metal salts, ammonium salts, inner esters, e.g., glucono-delta-lactone, and mixed salts such as potassium sodium salt of tartaric acid.

Additional chelating agents include the inorganic condensed polyphosphates. These may be represented, for example, by triphosphoric acid and other polyphosphoric acids as well as alkali metal salts such as sodium tripolyphosphate. Additional chelating agents include the 1-3 diketones such as salicyladehyde, acetoacetic ester, 2-hydroxynapthaldehyde-1, acetylacetone, 2-hydroxynapthaldehyde-3, and derivatives of such compounds.

The polymercaptan liquid resin is combined with a stabilizing amount of one or more chelating agents and almost always with an amount of such agents between about 0.001–5 weight percent based on the weight of the resin. Use of less than about 0.001 weight percent of agent, basis weight of resin, may not provide for desirably enhanced color stability while greater than about 5 weight percent of agent can be uneconomical. Advantageously for best economy with desirable color stability, the resin is combined with between about 0.01–2 percent of chelating agent.

The chelating agent may be blended directly with the liquid polymercaptan resin or it may be mixed in a liquid medium and the resulting medium blended with the resin. Test results indicate that even by this latter method some chelating agent will be retained by the liquid polymercaptan resin, although such medium is separated from the resin prior to storage of the resin. Advantageously for ease in separation of liquid medium from resin after intimate blending of the resin/liquid medium/chelating agent system, such liquid is a volatile liquid medium, i.e., one having a boiling point of about 1,000°C. or less at 760 mm. Hg pressure. Preferably for economy such liquid is simply water or an alcohol such as methanol. When separation of such liquid from the liquid resin after blending is desired, e.g., typically after blending of the resin with an equal volume or more of the medium, such separation can be accomplished by typically any method for separating liquids, e.g., initially decantation or vacuum siphoning followed by stripping at elevated temperature and reduced pressure such as a temperature above 50°C. and a pressure below about 50 mm. Hg absolute. Also, for stored systems, e.g., resin/filler and/or resin/stabilizer systems, color enhancement after storage by blending with a chelating agent can be augmented at elevated temperatures, such as 125°–175°F.

The resin combined with chelating agent for storage may be in further combination with other ingredients such as fillers and pigments. Thus, the end composition for storage used may include antioxidants, other resinous materials, pigments, fillers, brighteners, placticizers, diluents, dyes, cure accelerators, cure retarders, as well as other additives or components which may be formulated into sealing, caulking, molding, or adhesive compositions. Curing of the sealant is typically achieved in conventional manner, e.g., by the use of an oxidizing agent in powder, paste, or liquid form, with heat and/or humidity applied to accelerate the cure of the polymercaptan resin. The useful oxidizing systems include metal oxides and peroxides, anionic oxidants, organic redox systems, epoxy resins, organic peroxides, and the like including curing agents activated by atmospheric water. The liquid polymercaptan resin combined with chelating agent may be stored before use in a single package. A separate package can then contain one or more curing agents plus additional materials, e.g., fillers and pigments, or an epoxy resin where the packages are to be combined to form an expoy adhesive.

The following examples show ways in which the invention has been practiced but should not be construed as limiting the invention.

EXAMPLE 1

The polymercaptan resin employed is a mercaptan terminated liquid polymer having a viscosity of about 11,400–11,800 centipoises as measured at 25°C. with a Brookfield Viscometer Model RVT using a No. 6 spindle at 20 r.p.m., a mercaptan equivalent, expressed as milliequivalents of SH functionality per gram of resin, of about 3.58 as measured by iodimetric titration, and a specific gravity of 1.15. The resin is prepared in accordance with the teachings of U.S. Pat. No. 3,278,496 by reacting a hydroxy terminated liquid polyoxyalkylene glycol polymer having a molecular weight of about 400 with a halogenated epi-compound and then subsequently with a sulfur-contained reactant.

The chelating agents employed are anhydrous citric acid and DTPA. The citric acid has a molecular weight of 192.12, melting point of 153°C. and a solubility at 25°C. in water of 161.8 grams per 100 milliliters of water; the DTPA is diethylenetriaminepentaacetic acid, and is a pale straw colored liquid miscible with water to provide a total active ingredient as shown in the table below.

To 400 weight parts of the polymercaptan resin there is blended 400 parts of a premixed chelate aqueous wash solution containing the chelating agent in water in an amount as shown in the table below. This blend of resin and wash solution are agitated for 1 hour at a temperature of 45°C and thereafter held for 4 hours within the temperature range of 25°–45°C. The aqueous layer is removed from the resulting blend first with a vacuum siphon and then by vacuum stripping at a temperature of 90°–95°C. and a pressure of 0.3 millimeter of mercury absolute. Thereafter comparative samples of the chelate washed resin, as well as of resin which has not been washed and is employed for control purposes, are blended with 2,4,6-tris(dimethylaminomethyl) phenol in a weight ratio of 10 parts resin to one part phenol.

Immediately following this blending the color of the resulting blends as well as of the control is measured with a Gardner-Hellige Varnish Comparator using a Varnish Disc No. 620C–40. The results of such color determination are shown in the table below.

TABLE 1

| | Control | Citric Acid 0.1% | 0.5% | DTPA 0.26% |
|---|---|---|---|---|
| Gardner-Hellige Color | 6 | 2 | 2 | 1 |

These results demonstrate that the use of a chelating agent wash for the polymercaptan resin provides for excellent suppression of color change during preparation of the resin for storage. Since freshly prepared resin, before blending with the phenol as described above, has a Gardner-Hellige color of 1, these results show the excellent color retention obtained in the resin/phenol system by use of the chelated wash solutions.

The above procedure is repeated except that instead of employing 400 parts of chelate wash solution with 400 parts of liquid resin there are employed only 160 parts of the wash solution per 400 parts resin. Then to remove the water from the treated blend, there is first employed a vacuum siphon but the vacuum stripping is at a temperature of 60°–70°C. and a pressure of 0.5 millimeter mercury absolute. The results of the color determination tests for such resulting treated resins as well as for a control sample, and all conducted after blending, are shown in the table below.

TABLE 2

| | Control | Citric Acid 0.1% | 0.5% | DTPA 0.26% |
|---|---|---|---|---|
| Gardner-Hellige Color | 6 | 4 | 2 | 2 |

It thus can be appreciated from the above results that even with only a very minor amount of chelating agent highly desirable retention of resin color can be achieved.

EXAMPLE 2

To 500 weight parts of the polymercaptan resin of Example 1 there is blended 0.5 weight part of the trisodium salt of nitrilotriacetic acid monohydrate (NTA), which is a white granular powder having a molecular weight of 275 and a density of about 40 pounds per cubic foot. This mixture is purged with nitrogen, heated to 70°C., and agitated for 96 hours. Thereafter the blend is held for 24 hours under a nitrogen atmosphere and filtered.

The resulting material is subsequently blended with 2,4,6-tris(dimethylaminomethyl) phenol in a weight ratio of 10 parts of the treated resin to one part of the phenol. Additionally, 500 weight parts of untreated resin of Example 1 are also blended in like proportion with the phenol to serve as a control sample. Immediately thereafter, color determinations are run on the control sample as well as on the treated resin in the manner described in Example 1 and the results of this determination are shown in the table below.

TABLE 3

| | Control | NTA 0.5% |
|---|---|---|
| Gardner-Hellige Color | 6 | 2 |

As can be seen from these results the use of a solid chelating substance blended with the liquid polymercaptan resin provides excellent retardation of color change.

EXAMPLE 3

To 1,750 weight parts tap water there is added about 11 weight parts of concentrated sulfuric acid and 1.75 weight parts of the 40.2 percent active DTPA chelating agent described in Example 1. These materials are permitted to form an intimate blend by allowing to stand for seven hours with intermittent agitation. To 1600 weight parts of the liquid polymercaptan resin described in Example 1 there is added 1,000 weight parts of the above-described chelating solution. These materials are agitated for 10 minutes, allowed to stand for 18 hours, and then the aqueous phase is removed by siphoning and then vacuum stripping at a temperature of 150°–170°F.

A 100 weight part sample of the resulting washed resin is blended with 10 weight parts of 2,4,6-tris(dimethylaminomethyl) phenol. For comparative purposes a 100 weight part sample of the polymercaptan resin of Example 1 which has not been treated with chelating wash solution is also blended with 10 weight parts of such phenol. Immediately thereafter color determinations are made by visual inspection. The resin/phenol blend which has not been treated by the chelating solution wash is visually observed to have a medium amber coloration whereas the resin/phenol blend which has been treated by the chelating wash solution is seen by visual observation to have a pale yellow color. Such results thus further indicate a highly desirable repression of color change achieved by using the chelating agent wash solution.

Polymercaptan resins such as that described in Example 1 are typically employed to impart a rapid cure to epoxy resins when used, for example, as a resin/phenol blend discussed hereinabove. When the polymercaptan resins of the above examples, i.e., the resins that have been treated with a chelating agent and thereafter blended with phenol, are employed for rapid curing of epoxy systems, no loss in gel time is observed. That is, gel times are the same as with the polymercaptan resins that have not been treated with a chelating agent.

The effects of the chelating agents to suppress skinning on storage of the liquid polymercaptan resins can readily be observed by visual inspection of comparative materials. A suitable polymercaptan resin for such testing is one having a pH of 8.3, a specific gravity of 1.03, a molecular weight of about 5,000 and a mercaptan equivalent, expressed as milliequivalents of SH functionality per gram of resin, of 0.35 as measured by iodimetric titration. The resin is prepared from a propylene oxide derivative of trimethylol propane, which derivative is then reacted with epichlorohydrin and then subsequently with sodium sulfhydrate to prepare the polymercaptan resin.

When such a liquid resin is blended with a chelating agent, e.g., such an agent as oxalic acid, and stored alongside a comparative resin which is free from chelating agent, supressed skinning of the resin during storage can be observed in as quickly as only 1 month's time. Desirable suppression of skin formation for such resin containing chelating agent can be achieved for a storage period of as long as 9 months' time or more.

EXAMPLE 4

Three polymercaptan resins are used, all being viscous liquid polymers. Two are prepared by polymerizing an epihalohydrin in the presence of a hydrocarbon initiator supplying active hydrogen groups. The polymer thereby prepared has a backbone composed of hydrogen, carbon and oxygen and conversion of this polymer to a polymercaptan is effected, e.g., by reaction with sodium sulfhydrate, by replacing halide groups with SH groups.

One polymercaptan resin, denoted hereinafter as polymercaptan (or resin) A, has a molecular weight of about 1,600, a viscosity of about 1,500 centipoises as measured at 25°C. with a Brookfield Viscometer Model RVT, using a number 6 spindle at 20 r.p.m., and a mercaptan equivalent of 1.46 milliequivalents of SH functionality per gram of resin. The other polymercaptan resin, noted hereinafter as resin B, has a molecular weight of about 5,200–5,300, and a viscosity of about 2,700 centipoises, measured in the same manner. This resin B has a mercaptan equivalent of about 0.58–0.59 milliequivalents of SH functionality per gram of resin.

The third resin, termed hereinafter as Resin C, also has a backbone of hydrogen, carbon and oxygen, with oxyalkylene groups connected with para-substituted phenyl groups, there thus being aromatic carbon atoms in the resin. This resin has a viscosity at 77°F. of 2,500 centipoises and a mercaptan equivalent weight of above about 4.2–4.4 milliequivalents of SH functionability per gram of resin. Samples of each resin are taken and each is blended with sufficient of the phenol identified in Example 1 to provide two resin A blends of 16.7 weight percent phenol, two resin B blends of 16.7 weight percent phenol, and two resin C blends of 12 weight percent of phenol.

Two 50 weight part samples of each resin blend are taken and one sample of each is blended with 0.1 weight part of the DTPA chelating agent described in Example 1, except the resin C sample is blended with 0.25 weight part of agent. All samples are then heated at 120°F., with the two resin A and the two resin B samples being maintained at that temperature for 72 hours and the resin C samples being retained for 90 hours.

All samples are then cooled and visually inspected. The resin A sample without chelating agent is dark amber, while the agent treated sample shows only a slight yellowish cast. The resin B sample not blended with chelating agent is amber-green; contrasted with this, the agent treated sample exhibits merely a tinge of yellowish-green hue. The untreated resin C sample is amber, while the treated sample is virtually colorless. These results demonstrate the utility of a chelating agent, in intimate blend, for differing polymercaptan resins, for providing excellent improvement of color change during preparation of the resin for storage.

I claim:

1. In a liquid resinous composition comprising a combination of liquid polymercaptan resin and nitrogenous base, wherein said resin has an average molecular weight between about 300–25,000 and an SH equivalency of between about 0.05–6 milliequivalents per gram of resin, and said base has a $pK_a$ in aqueous solution at 25°C. above about 2, the improvement wherein the combination further includes a stabilizing amount of a chelating substance selected from the group consisting of amino carboxylic acids, hydroxy carboxylic acids, inorganic condensed polyphosphates, 1,3-diketones and mixtures thereof, thereby forming a resinous composition having enhanced color stability and retarded skin formation.

2. The composition of claim 1 wherein said organic chelating substance is present in said composition in an amount between about 0.001–5.0 weight percent based on the weight of said polymercaptan resin and said resin contains an oxyalkylene substituent.

3. The composition of claim 1 wherein said polymercaptan resin has an average molecular weight between about 600–15,000 and an SH equivalence of between about 0.2–4.5.

* * * * *